US011821880B2

(12) United States Patent
Raymond et al.

(10) Patent No.: US 11,821,880 B2
(45) Date of Patent: Nov. 21, 2023

(54) ACTIVE DAMPENING GRADIENT PROPORTIONING VALVE

(71) Applicant: Waters Technologies Corporation, Milford, MA (US)

(72) Inventors: Timothy M. Raymond, Milford, MA (US); Christopher Walden, Milford, MA (US); Sean Anderson, Dedham, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 32 days.

(21) Appl. No.: 17/104,660

(22) Filed: Nov. 25, 2020

(65) Prior Publication Data

US 2021/0156829 A1 May 27, 2021

Related U.S. Application Data

(60) Provisional application No. 62/941,236, filed on Nov. 27, 2019.

(51) Int. Cl.
*G01N 30/32* (2006.01)
*B01D 15/16* (2006.01)
(Continued)

(52) U.S. Cl.
CPC ........... *G01N 30/32* (2013.01); *B01D 15/163* (2013.01); *B01D 15/166* (2013.01);
(Continued)

(58) Field of Classification Search
CPC ....... G01N 2030/027; G01N 2030/205; G01N 2030/322; G01N 2030/326;
(Continued)

(56) References Cited

U.S. PATENT DOCUMENTS 2,902,988 A 9/1959 Rippingille
3,327,729 A 6/1967 Erickson
(Continued)

FOREIGN PATENT DOCUMENTS

CN 109444310 A * 3/2019 ............ G01N 30/34
CN 109444310 A 3/2019
(Continued)

OTHER PUBLICATIONS

International Search Report and Written Opinion in PCT/US2020/062258 dated Mar. 3, 2021.
(Continued)

*Primary Examiner* — Harshad R Patel
*Assistant Examiner* — Gedeon M Kidanu
(74) *Attorney, Agent, or Firm* — Schmeiser, Olsen & Watts LLP; Victor J. Baranowski

(57) ABSTRACT

Disclosed is a gradient proportioning valve for use in liquid chromatography that includes a plurality of inlet ports configured to receive a plurality of fluids, a manifold connected to each of the plurality of inlet ports configured to mix the plurality of fluids in a controlled manner to provide a fluid composition, the manifold including a plurality of conduits internal to the manifold, each of the plurality of conduits receiving fluid through a respective one of the plurality of inlet ports, each of the plurality of conduits operatively communicable to a respective actuation mechanism configured to open and close each of the plurality of conduits in a controlled manner, a common outlet port configured to receive the fluid composition, and an active fluidic dampening system configured to dampen unwanted fluidic pressure pulses in the manifold. Liquid chromatography systems and methods are further disclosed.

20 Claims, 6 Drawing Sheets

(51) Int. Cl.
*G01N 30/34* (2006.01)
*G01N 30/20* (2006.01)
*B01F 25/00* (2022.01)
*G01N 30/02* (2006.01)

(52) U.S. Cl.
CPC ......... *B01F 25/1051* (2022.01); *G01N 30/20* (2013.01); *G01N 30/34* (2013.01); *G01N 2030/027* (2013.01); *G01N 2030/205* (2013.01); *G01N 2030/322* (2013.01); *G01N 2030/328* (2013.01); *G01N 2030/347* (2013.01)

(58) Field of Classification Search
CPC ....... G01N 2030/328; G01N 2030/347; G01N 30/20; G01N 30/32; G01N 30/34; F04B 11/00; F04B 11/0008; F04B 11/0091; F04B 13/02; F04B 49/065; F04B 7/04; B01F 25/1051; B01D 15/163; B01D 15/166
See application file for complete search history.

(56) References Cited

U.S. PATENT DOCUMENTS

| | | | |
|---|---|---|---|
| 3,398,689 A | 8/1968 | Allington | |
| 3,985,019 A | 10/1976 | Boehme et al. | |
| 4,045,343 A | 8/1977 | Achener et al. | |
| 4,128,476 A | 12/1978 | Rock | |
| 4,347,131 A | 8/1982 | Brownlee | |
| 4,383,551 A | 5/1983 | Lynch et al. | |
| 4,427,298 A | 1/1984 | Fahy et al. | |
| 4,437,812 A | 3/1984 | Abu-Shumays et al. | |
| 4,448,692 A | 5/1984 | Nakamoto et al. | |
| 4,478,713 A | 10/1984 | Girot et al. | |
| 4,522,231 A | 6/1985 | Bergmann | |
| 4,595,496 A | 6/1986 | Carson | |
| 4,749,976 A | 6/1988 | Pichler | |
| 4,947,893 A | 8/1990 | Miller et al. | |
| 5,105,851 A | 4/1992 | Fogelman | |
| 5,158,441 A | 10/1992 | Aid et al. | |
| 5,253,981 A | 10/1993 | Yang et al. | |
| 5,494,076 A | 2/1996 | Knapp | |
| 5,755,561 A * | 5/1998 | Couillard | F04B 13/02 417/248 |
| 5,862,832 A * | 1/1999 | Victor | G01N 30/34 138/30 |
| 6,116,869 A * | 9/2000 | Couillard | F04B 11/0016 417/442 |
| 6,242,209 B1 * | 6/2001 | Ransom | G01N 15/1404 435/283.1 |
| 2005/0013708 A1 | 1/2005 | Peeler et al. | |
| 2008/0099706 A1 * | 5/2008 | Cook | F16K 37/0041 327/306 |
| 2009/0065724 A1 | 3/2009 | Mitton et al. | |
| 2010/0012192 A1 * | 1/2010 | Dourdeville | F16K 15/1823 137/1 |
| 2010/0301069 A1 | 12/2010 | Bensley | |
| 2015/0040992 A1 * | 2/2015 | Shreve | G01N 30/02 137/565.17 |
| 2015/0043303 A1 | 2/2015 | Shreve et al. | |
| 2017/0167476 A1 * | 6/2017 | Bozic | G01N 30/32 |
| 2022/0326197 A1 | 10/2022 | Otsubo et al. | |

FOREIGN PATENT DOCUMENTS

| | | |
|---|---|---|
| EP | 0830534 A1 | 3/1998 |
| EP | 1887353 A1 | 2/2008 |
| JP | 2017115886 A | 6/2017 |
| WO | 2007119149 A2 | 10/2007 |

OTHER PUBLICATIONS

International Search Report and Written Opinion in PCT/US2020/062276 dated Mar. 10, 2021.
International Search Report and Written Opinion in PCT/US2020/062297 dated Feb. 26, 2021.
Saunders, D.L., "A Versatle Gradient Elution Device for HPLC," Journal of Chromatographic Science, Mar./Apr. 1977. 8 pages.
International Preliminary Report on Patentability in PCT/US2020/062258 dated Jun. 9, 2022.
International Preliminary Report on Patentability in PCT/US2020/062276 dated Jun. 9, 2022.
International Preliminary Report on Patentability in PCT/US2020/062297 dated Jun. 9, 2022.
Non-Final Office Action in U.S. Appl. No. 17/104,772 dated Sep. 21, 2022.
Non-Final Office Action in U.S. Appl. No. 17/104,874 dated Aug. 22, 2022.
Restriction Requirement in U.S. Appl. No. 17/104,772 dated Jul. 15, 2022.
Final Office Action in U.S. Appl. No. 17/104,772 dated Jan. 9, 2023.
Final Office Action in U.S. Appl. No. 17/104,874 dated Mar. 1, 2023.
Notice of Allowance in U.S. Appl. No. 17/104,874 dated Jul. 3, 2023.
Non-Final Office Action in U.S. Appl. No. 17/104,772 dated Jul. 21, 2023.

* cited by examiner

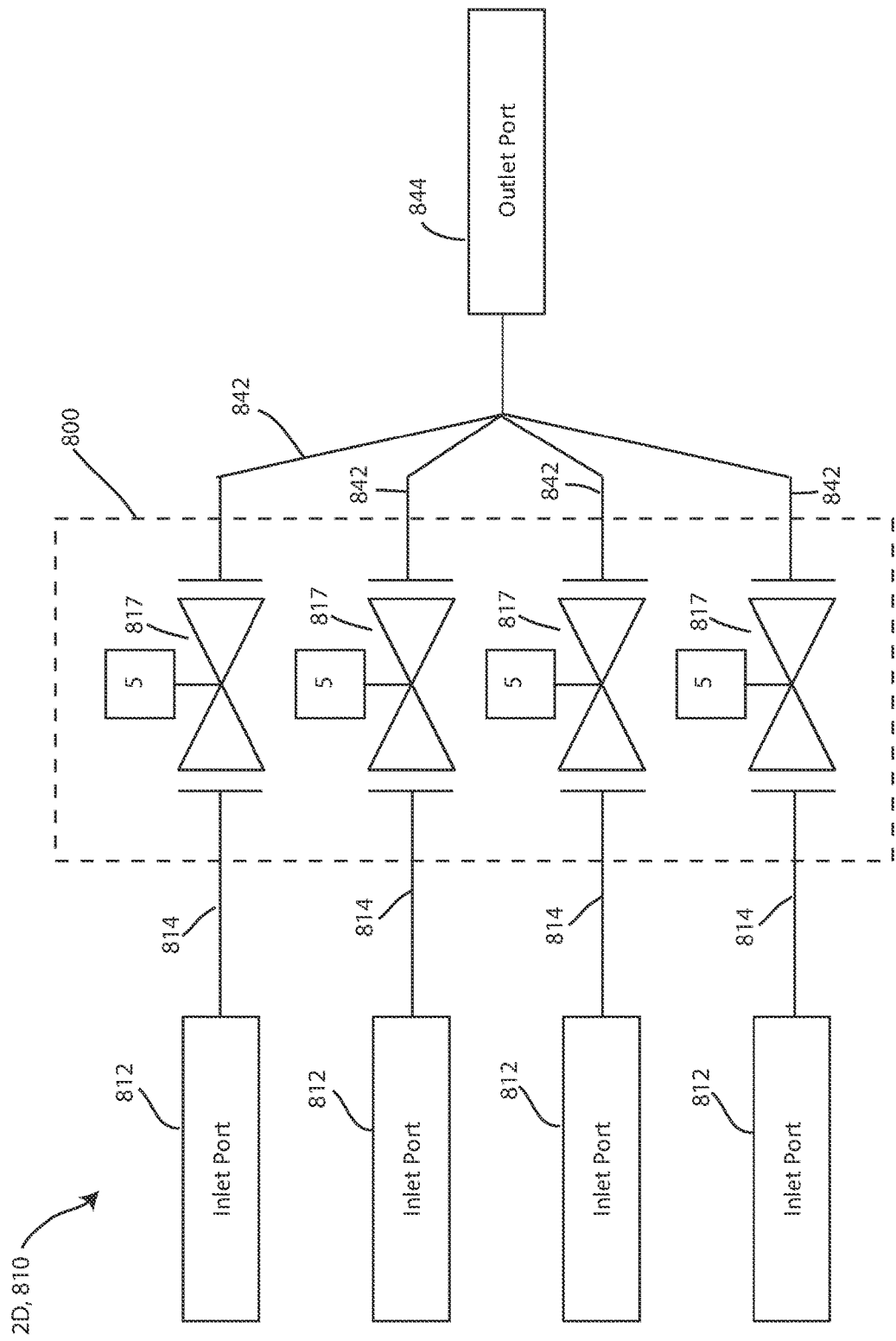

ACTIVE DAMPENING GRADIENT PROPORTIONING VALVE

RELATED APPLICATIONS

This application is a non-provisional patent application claiming priority to U.S. Provisional Patent Application No. 62/941,236, filed Nov. 27, 2019, entitled "Gradient Proportioning Valve," which is incorporated herein by reference.

FIELD OF THE INVENTION

The invention relates generally to gradient proportioning valves. More particularly, the invention relates to a gradient proportioning valve having active dampening features, and associated systems and methods.

BACKGROUND

Gradient proportioning valves (GPVs) are known for use in low pressure mixing liquid chromatography systems (i.e. quaternary systems). U.S. Pat. No. 5,862,832 describes an exemplary prior art GPV. Specifically, the GPV is responsible in the systems for setting the desired solvent composition. A typical GPV includes multiple solenoid valves mounted on a common manifold that open and close at precise times with respect to the system pump cycle. Upon opening and closing of GPV solenoid valves, pressure pulses are introduced to the system. Pressure pulses are also caused by the start and end of the intake stroke during the pump cycle. Such pressure pulses can cause undesirable oscillations in the compositional error of chromatography systems. These oscillations therefore diminish compositional accuracy and performance of a liquid chromatography system.

SUMMARY

In one embodiment, a gradient proportioning valve for liquid chromatography comprises: a plurality of inlet ports configured to receive a plurality of fluids; a manifold connected to each of the plurality of inlet ports configured to mix the plurality of fluids in a controlled manner to provide a fluid composition, the manifold including a plurality of conduits internal to the manifold, each of the plurality of conduits receiving fluid through a respective one of the plurality of inlet ports, each of the plurality of conduits operatively communicable to a respective actuation mechanism configured to open and close each of the plurality of conduits in a controlled manner; a common outlet port configured to receive the fluid composition; and an active fluidic dampening system configured to dampen unwanted fluidic pressure pulses in the manifold.

Additionally or alternatively, the active fluidic dampening system includes an active pulse dampening actuator separate from the respective actuation mechanisms configured to actively introduce additional pressure pulses into the manifold to destructively interfere with the unwanted fluidic pressure pulses in the manifold.

Additionally or alternatively, the active fluidic dampening system includes a control system configured to alter the timing of opening and closing by the respective actuation mechanisms to destructively interfere with the unwanted fluidic pressure pulses in the manifold.

Additionally or alternatively, the gradient proportioning valve further comprises the plurality of the respective actuation mechanisms, where each of the plurality of respective actuation mechanisms is a voice coil actuator valve, and where the fluidic dampening system includes the voice coil actuator valves.

Additionally or alternatively, the active pulse dampening actuator includes a control system built into the valve for controlling the active pulse dampening actuator.

Additionally or alternatively, the control system is configured to operate with a feedback loop to ensure proper dampening of the unwanted fluidic pressure pulses in the manifold.

Additionally or alternatively, the control system includes a communication device configured for at least one of sending and receiving control signals from a liquid chromatography system.

Additionally or alternatively, the communication device is configured to receive an input signal in response to an unwanted pressure response caused by one or more of the actuation mechanisms.

Additionally or alternatively, the active pulse dampening actuator is located downstream from the respective actuation mechanisms and upstream from the common outlet port.

Additionally or alternatively, the control system is a dithering control unit built into the valve.

Additionally or alternatively, the dithering control unit includes a communication device configured for at least one of sending and receiving control signals from a liquid chromatography system.

Additionally or alternatively, the dithering control unit is configured to reduce quantization errors by purposefully introducing consistent pressure noise.

In another embodiment, a method of mixing fluid in liquid chromatography comprises: providing a gradient proportioning valve; receiving a plurality of fluids in a plurality of inlet ports of the gradient proportioning valve; mixing the plurality of fluids in a controlled manner within a manifold of the gradient proportioning valve to provide a fluid composition, the manifold including a plurality of conduits; opening and closing each of the plurality of conduits in a controlled manner; outputting the fluid composition from a common outlet port of the gradient proportioning valve; and dampening unwanted fluidic pressure pulses in the manifold with an active fluidic dampening system.

Additionally or alternatively, the method further includes actively introducing additional pressure pulses into the manifold and destructively interfering with unwanted fluidic pressure pulses in the manifold with an active pulse dampening actuator.

Additionally or alternatively, the method further includes altering the timing of the opening and closing by a control system; and destructively interfering with the unwanted fluidic pressure pulses in the manifold by the altering.

Additionally or alternatively, the method further includes ensuring, by the control system, proper dampening of the unwanted fluidic pressure pulses in the manifold with a feedback loop.

Additionally or alternatively, the method further includes receiving, by the control system, an input signal in response to an unwanted pressure response caused by one or more of the actuation mechanisms.

Additionally or alternatively, the opening and closing each of the plurality of conduits in a controlled manner is performed by a respective solenoid valve, and the method further includes: mitigating unwanted fluidic pressure pulses created by the opening and closing of the solenoid valve with a ceramic sealing valve piston.

Additionally or alternatively, the opening and closing each of the plurality of conduits in a controlled manner is performed by a respective voice coil actuator valve, and the method further includes: dampening the unwanted fluidic pressure pulses with the respective voice coil actuator valves; and opening and closing each of the plurality of conduits at variable speeds with the voice coil actuator valves.

In another embodiment, a liquid chromatography system includes a gradient proportioning valve having a plurality of inlet ports configured to receive a plurality of fluids, a manifold connected to each of the plurality of inlet ports configured to mix the plurality of fluids in a controlled manner to provide a fluid composition, the manifold including a plurality of conduits internal to the manifold, each of the plurality of conduits receiving fluid through a respective one of the plurality of inlet ports, each of the plurality of conduits operatively communicable to a respective actuation mechanism configured to open and close each of the plurality of conduits in a controlled manner, a common outlet port configured to receive the fluid composition, and an active fluidic dampening system configured to dampen unwanted fluidic pressure pulses in the manifold. The liquid chromatography system further includes an injector; a separation column; and a detector.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

FIG. 6 depicts a schematic view of another gradient proportioning valve having a dithering control unit, in accordance with one embodiment.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

Figure 2:
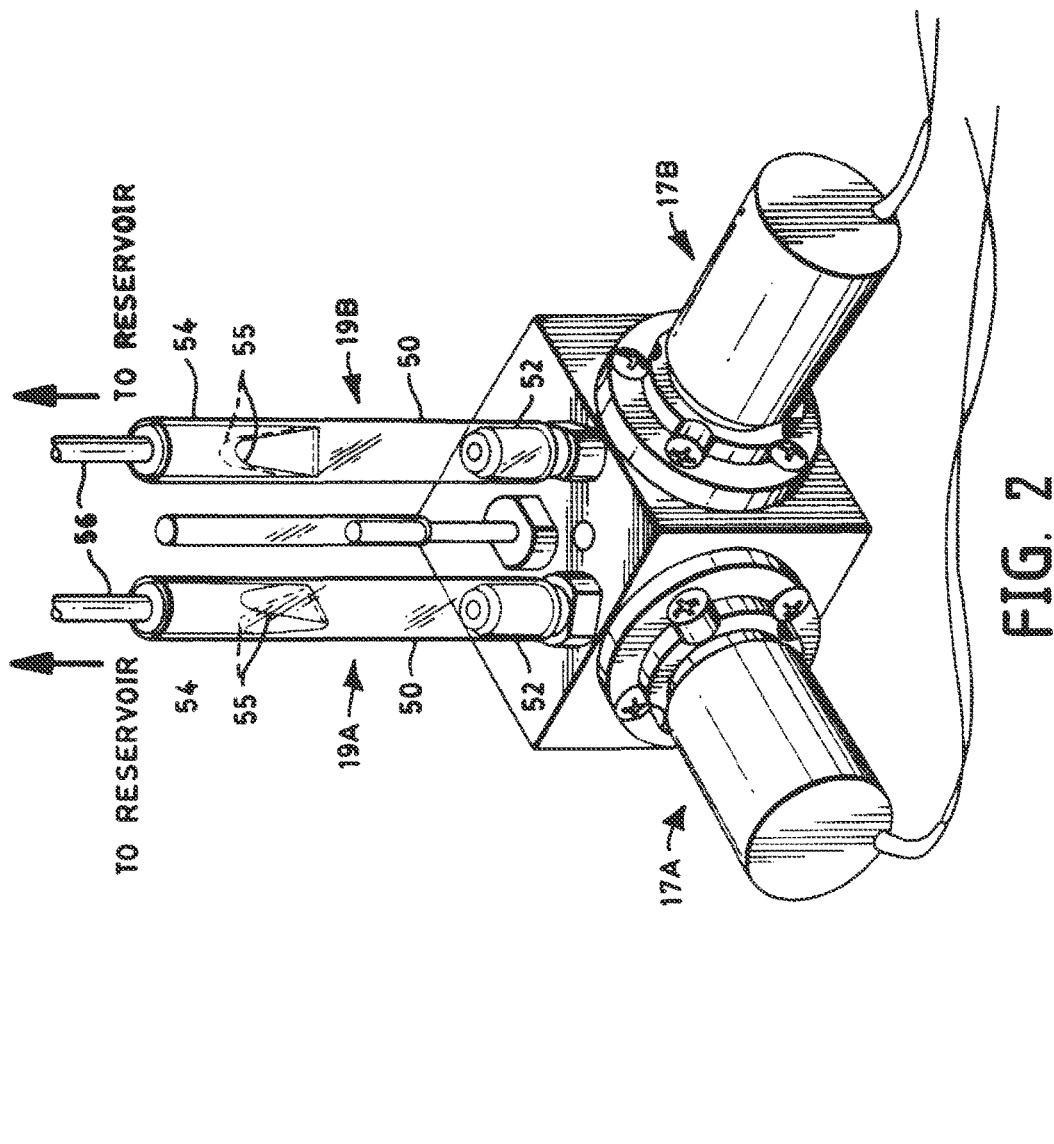
FIG. 2 depicts a perspective view of a gradient proportioning valve, in accordance with one embodiment.

A gradient proportioning valve accommodates the flow of fluids from external reservoirs into the valve for mixing in appropriate proportions to form a liquid composition. In an actual embodiment, such a valve may include four inlet valves ported to a common outlet, the embodiment shown hereinbelow in FIG. 2 shows two inlet valves ported to a common outlet. In terms of functionality, each inlet valve may be a normally closed, solenoid actuated diaphragm valve that is switched in a controlled manner to provide the appropriate amount of fluid required in mixing the liquid composition. The function of the overall valve is to provide a continuous stream of a compositionally accurate mixture of components, such as solvents in a high pressure liquid chromatography (HPLC) implementation. The mixture may be provided from the common outlet under flowing conditions, while not interfering with the flow rate of the fluid input system, and without changing or otherwise affecting the quality/composition of the fluids input for mixing.

Embodiments of the gradient proportioning valve described herein may be configured to actively dampen or otherwise reduce pressure pulses that occur due to the opening and closing of channels in the fluidic systems of the valve, and in the valve itself. Such pressure pulses have been found to cause large, sinusoidal oscillations in compositional error. Active dampening may include dampening these fluidic pressure pulses with an active, powered, and/or controlled device. Thus, the gradient proportioning valves described herein may be configured to provide improved compositional accuracy across an entire solvent composition range. This improved compositional accuracy may be particularly important at higher flow rates.

Figure 1:
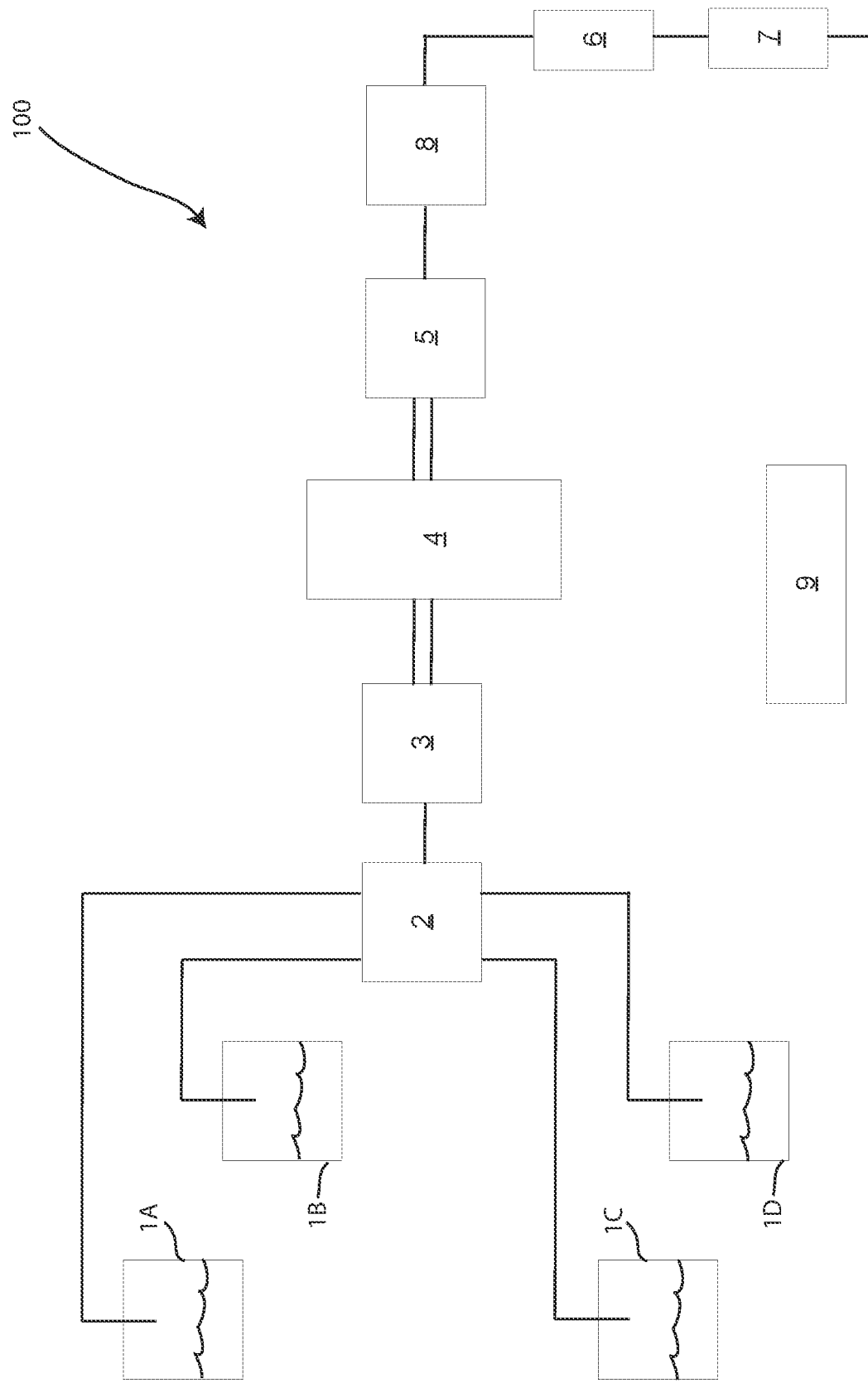
FIG. 1 depicts a block diagram of a liquid chromatography apparatus, in accordance with one embodiment.

FIG. 1 is a block diagram of an exemplary liquid chromatography system 100, suitable for preparative- or process-scale liquid chromatography, in accordance with one embodiment of the invention. The system 100 is an exemplary system within which gradient proportioning valves may be included according to the embodiments described herein. The apparatus 100 includes four solvent reservoirs 1A, 1B, 1C, 1D, a gradient proportioning valve 2, an inlet manifold valve 3, a pump 4, a solvent mixer 5, an injector 8, a separation column 6, a detector 7, and a control unit 9. The gradient proportioning valve 2 represents a valve that includes one or more of the dampening features described herein. Thus, the gradient proportioning valve 2 may be any of the gradient proportioning valves shown in FIGS. 2-6 and described herein below.

In operation, the gradient proportioning valve 2 and the pump 4, in response to control of the control unit 9, select and draw one or more solvents from the reservoirs 1A, 1B, 1C, 1D. The gradient proportioning valve 2 may be operated, in response to control of the control unit 9, to provide a selected solvent composition, which is optionally varied in time, for example, to implement gradient-mode chromatography. The solvent mixer 5 is any suitable mixer, including known passive and active mixers. The injector is any suitable injector 8, including known injectors, for injecting a sample into the solvent flow. The injector 8 is optionally disposed at alternative locations in the solvent flow path, as will be understood by one having ordinary skill in the liquid-chromatography arts. The inlet manifold valve 3 is connected to an outlet tube from the gradient proportioning valve 2, and to two inlet tubes connected to the pump 4, to supply solvent to the two piston chambers. The inlet manifold valve 3 optionally includes a sample injector, to inject samples into the solvent prior to its entry into the pump 4. The control unit 9—including, for example, a personal computer or workstation—receives data and/or provides control signals via wired and/or wireless communications to, for example, the gradient-proportioning valve 2, the pump inlet manifold 3, the pump 4, and/or the detector 7. The control unit 9 supports, for example, automation of sample processing. Moreover, the control unit 9 may be configured to control one or more of the active fluidic dampening system(s) described herein, as described herein below. The control unit 9, in various illustrative embodiments, is implemented in software, firmware, and/or hardware (e.g., as an application-specific integrated circuit). The control unit 9 includes and/or is in communication with storage component(s).

Suitable implantations of the control unit 9 include, for example, one or more integrated circuits, such as microprocessors. A single integrated circuit or microprocessor in some alternative embodiments includes the control unit 9 and other electronic portions of the apparatus 100. In some embodiments, one or more microprocessors implement software that enables the functions of the control unit 9. In some embodiments, the software is designed to run on general-purpose equipment and/or specialized processors dedicated to the functionality herein described.

In some implementations of the system 100, the control unit 9 includes a user interface to support interaction with the control unit 9 and/or other portions of the system 100. For example, the interface is configured to accept control information from a user and to provide information to a user about the system 100. The user interface is used, for example, to set system control parameters and/or to provide diagnostic and troubleshooting information to the user. In one embodiment, the user interface provides networked communication between the system 100 and users located either local to the operating environment or remote from the operating environment. The user interface in some implementations is used to modify and update software. In view of the description of illustrative embodiments provided herein, it will be apparent to one having ordinary skill in the separation arts that various other configurations and implementations of control units can be utilized in other embodiments of the invention to provide automated control of process-scale and preparative-scale chromatography.

The pump 4 may be configured to provide solvent at pressures of at least 500 psi, or 1,000 psi, or 5,000, psi 10,000 psi or greater. The pump includes any suitable piston-based pump, including known pumps, such as available from Waters Corporation, Milford, Mass. The column 6 is any column suitable for process-scale and preparative-scale chromatography. The column contains, for example, any medium suitable for such a purpose, including known media. The sorbent material is selected from any suitable sorbent material, including known materials such as silica or a mixture of silica and a copolymer such as an alkyl compound. The solvents are any solvents suitable to a desired separation process, including known solvents.

Again, the system 100 described above is meant to be an exemplary liquid chromatography system in which various embodiments of the gradient proportioning valves may be deployed. However, the gradient proportioning valves described herein may be implemented in any system in which gradient fluid mixing is performed. For example, in a liquid chromatography quaternary system, after the solvent reservoirs 1A, 1B, 1C, 1D, the next component the solvent goes into may be a degasser chamber. From there, the solvent may enter the gradient proportioning valve 2. After the gradient proportioning valve 2, the solvent may then go through a check valve to the pump (i.e. with no inlet manifold valve). Any liquid chromatography system configurations which may deploy a gradient proportioning valve are contemplated for incorporation of the principles described herein.

Referring now to FIG. 2, a perspective view of a gradient proportioning valve 2A is shown, in accordance with one embodiment. The gradient proportioning valve 2A includes accumulators 19A, 19B located directly adjacent to switching valves 17A, 17B, on the side closest to the reservoirs 10A, 10B. It should be understood that embodiments of the gradient proportioning valve 2A may include two additional accumulators and switching valves (not shown) located on the two open sides of the gradient proportioning valve 2A, thereby connecting the gradient proportioning valve 2 to two additional reservoirs, such as the reservoirs 1C, 1D shown in FIG. 1. Each of the accumulators 19A, 19B may include a soft-walled flexible plastic tube 50 of generally circular cross-section. As shown, the accumulator tube 50 may be adapted at an end closest to the valve inlet to snugly slide over a rigid plastic connector 52. A connecting tube 54 may be implemented at the opposite end of the accumulator tube to hold a relatively long length of flow tubing 56 that connects the valves with the reservoirs 1A, 1B. The end of the accumulator tube adjacent to the connecting tube may be caused to assume approximately the cross-section of a flattened ellipse 55 which may allow a significant internal volume change to occur in the accumulator tube, with little change in pressure thereby allowing the accumulator to overcome the effects of hydraulic inertia.

Figure 3:
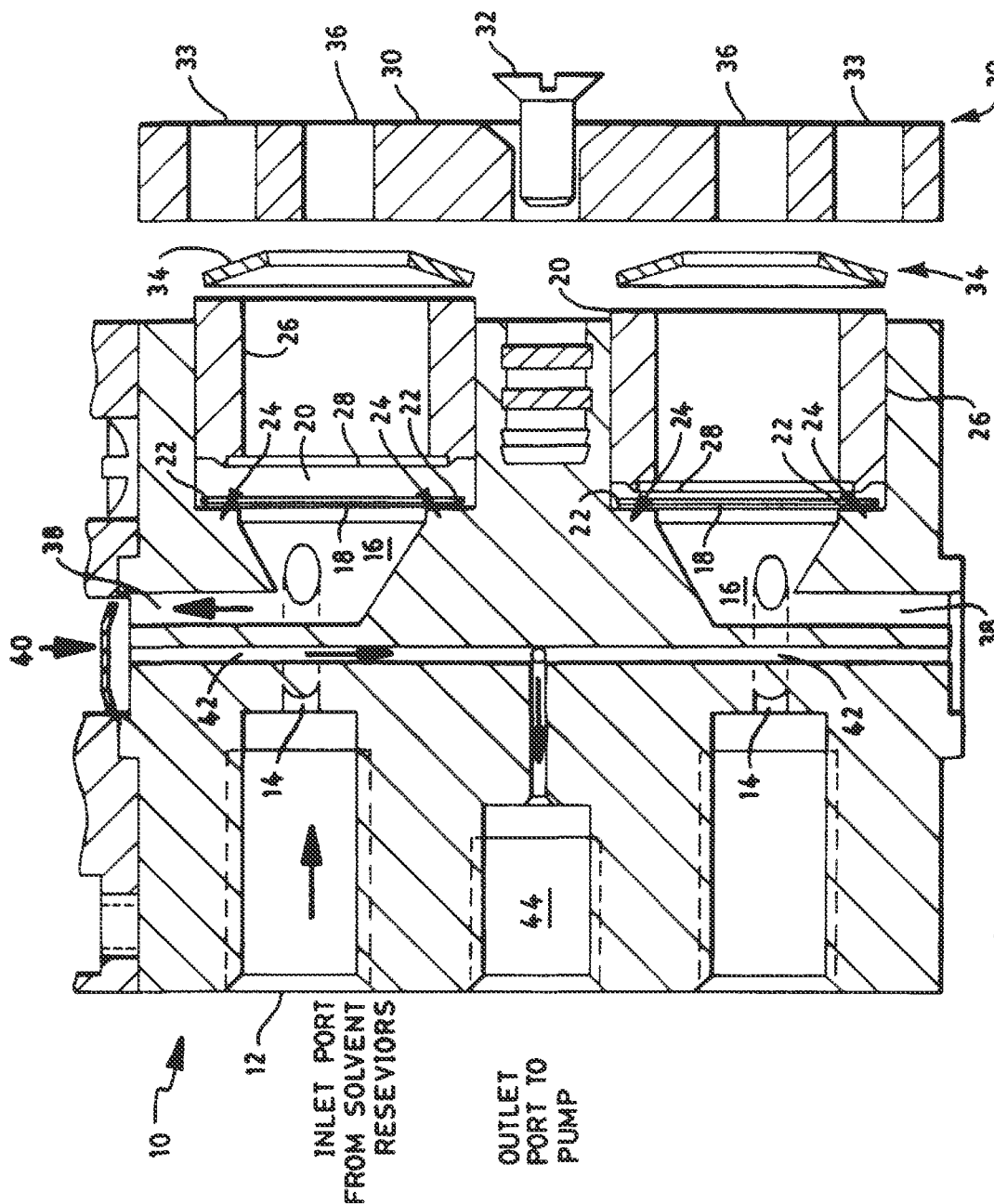
FIG. 3 depicts a side cross sectional view of the gradient proportioning valve of FIG. 2, in accordance with one embodiment.

FIG. 3 depicts a side cross sectional view of the gradient proportioning valve 2A of FIG. 2, in accordance with one embodiment. The gradient proportioning valve 2A includes a valve manifold 10 that accommodates the flow of fluids from external reservoirs (not shown). For the sake of clarity of the discussion hereinafter, the illustrative valve described herein has the capacity to mix only two input fluid streams. However, the features described herein may be applied to valves mixing, for example, four or more input fluid streams. The input fluid streams to be mixed are received from the reservoirs and are introduced into the valve at inlet ports 12. Fluids from the respective reservoirs, such as solvents used in HPLC as known in the art, flow into respective inlet ports 12 and thereafter flow through respective inlet conduits 14 in the manifold 10 into respective accumulator volumes or chambers 16.

The integral accumulator chambers 16, as well as the inlet ports 12 and inlet conduits 14, are appropriately dimensioned as a function of the flow rate of the valve application. The chamber 16 is frustum-shaped having a conical-base opposed to the inlet conduit 14. The chamber is shaped to maximize the surface area of the diaphragm (for compliance), and the inlet conduit 14 is positioned to allow for the best swept volume geometry. Accordingly, the chamber 16 also has a smooth transition from larger to smaller cross-section. The placement of the chamber is such that the fluidic resistance between a valve diaphragm 40 (discussed hereinafter) and the accumulator is minimized. Fluid flowing through the conduit 14 flows perpendicular to the conical-base, into the chamber 16 to confront the base or back of the chamber 16.

An accumulator diaphragm 18 is positioned at the conical-base or back of the chamber 16, opposite the inlet conduit 14. The diaphragm 18 in this illustrative embodiment, is a 0.002 inch thick film formed of Polytetrafluoroethylene (PTFE) laminated on each side with Fluorinated Ethylene Propylene (FEP).

The diaphragm, as with all components in the fluid path of the present illustrative embodiment, is formed of materials that are functionally unaffected by a full range of organic solvents and aqueous solutions of acids, bases, salts, surfactants, etc. and other phase modifiers that may be used in any mode of liquid chromatography. The diaphragm 18 effects a membrane or compliant member at the back of the accumulator chamber 16 to allow internal volume changes in the chamber to occur with little change in pressure. Accordingly, as with the less advantageous accumulator tubes of the prior art, the valve can overcome the effects of hydraulic inertia. The compliance and damping of the diaphragm are optimized for the applications flow characteristics, as will be appreciated by those skilled in the art.

An oversized bore 20 behind the back of the conical-base or back of the accumulator chamber 16 is configured to receive the diaphragm 18 for clamping and sealing the diaphragm tightly therein. A seating surface 22 interior to the bore 20 provides an abutment against which the diaphragm seats. A sealing groove 24 is disposed in the seating surface 22 and provides a portion of the single seal effected in the implementation according to the invention. A cylindrical sealing plug 26 formed of stainless steel, includes a sealing ridge 28 that fits tightly into the sealing groove 24 to seal the diaphragm in the bore 20 when the plug 26 is engaged against the seating surface 22 with the diaphragm sandwiched therebetween.

Preferably, the sealing plug 26 is dimensioned to fit snugly, yet slidably within the bore 20. The plug 26 is held in place by a clamping plate 30 which is mechanically attached to the valve manifold such as by a screw 32. Additional mounting holes 33 are provided in the clamping plate 30 to facilitate the mechanical fastening of the clamping plate 30 to the valve manifold 10. In this illustrative embodiment, resilient members such as belleville springs 34 or washers are disposed between the sealing plug 26 and the clamping plate 30, to provide some resiliency.

The diaphragm according to the invention overcomes hydraulic inertia while minimizing the volume of fluid in the valve that is exposed to potential air permeation, by limiting the surface area of the diaphragm that is exposed to ambient air. In contrast to the prior art wherein the entirety of the accumulator tubes were exposed and the volumes of fluid therethrough subjected to ambient air permeating the tubes, the diaphragm according to the present invention is only exposed to ambient in a limited manner. Atmospheric ports 36 are provided in the clamping plate 30 to permit ambient air at the back of the diaphragm 18. While exposure to ambient air is necessary for the diaphragm to perform its intended function, the reduced surface area exposed within the atmospheric ports significantly limits permeation of air through the diaphragm.

As briefly described hereinbefore, input fluid streams to be mixed are received from reservoirs and are introduced into the valve manifold 10 at inlet ports 12. Fluids from the respective reservoirs flow into respective inlet ports 12 and thereafter flow through respective inlet conduits 14 in the manifold 10 into respective accumulator volumes or chambers 16.

In the respective integral accumulator chambers 16 the fluids to be mixed encounter the compliant diaphragm which allows internal volume changes in the chambers to occur with little change in pressure so that the valve can overcome the effects of hydraulic inertia. The fluids to be mixed flow out of the chambers 16 through chamber ports 38 whereupon the fluids are available at switched valve diaphragms 40. The valve diaphragms are reciprocated by switched valves as known in the art. The controlled switching of the valve diaphragms determines the proportion of a respective fluid that is received in a common port 42 within the valve manifold 10. The respective fluids are mixed in their respective proportions in the common port 42 and are available at an outlet port 44 for downstream processing as known in the art.

Although only a two input valve is described in the illustrative embodiment herein, it will be appreciated that the concepts according to the invention could be implemented in a valve having any number of inlet ports for mixing a liquid composition.

While the diaphragm described herein is formed of FEP-PTFE-FEP laminated, it will be appreciated that other materials can be implemented to effect a diaphragm, such as thin stainless steel, various composite materials, rubber or the like.

Although the sealing plug in the illustrative embodiment is a cylindrical plug formed of stainless steel, it will be appreciated that alternative sealing mechanisms can be implemented while permitting ambient pressure at the back of the diaphragm, such as spongy materials, cylindrically shaped composite material or the like. Furthermore, while the sealing plug effects a tight seal by having a sealing ridge that seats in a sealing groove in a bore receiving the plug, it will be appreciated that the groove could be in the plug and the ridge on a surface of the bore.

The embodiments of the gradient proportioning valve 2A include an active fluidic dampening system including one or more active dampening mechanisms, systems or methods, configured to actively dampen unwanted fluidic pressure pulses in the manifold. Thus, the gradient proportioning valve 2A may be configured to actively dampen or otherwise reduce pressure pulses that occur due to the opening and closing of channels in the fluidic systems associated with the valve 2A, and within the valve 2A itself. This active dampening may be configured to reduce pressure pulses that occur due to, for example, the activation of the solenoid valves 17A, 17B. Using the below described active fluid dampening system(s), improved compositional accuracy across an entire solvent composition range may be provided.

Figure 4:
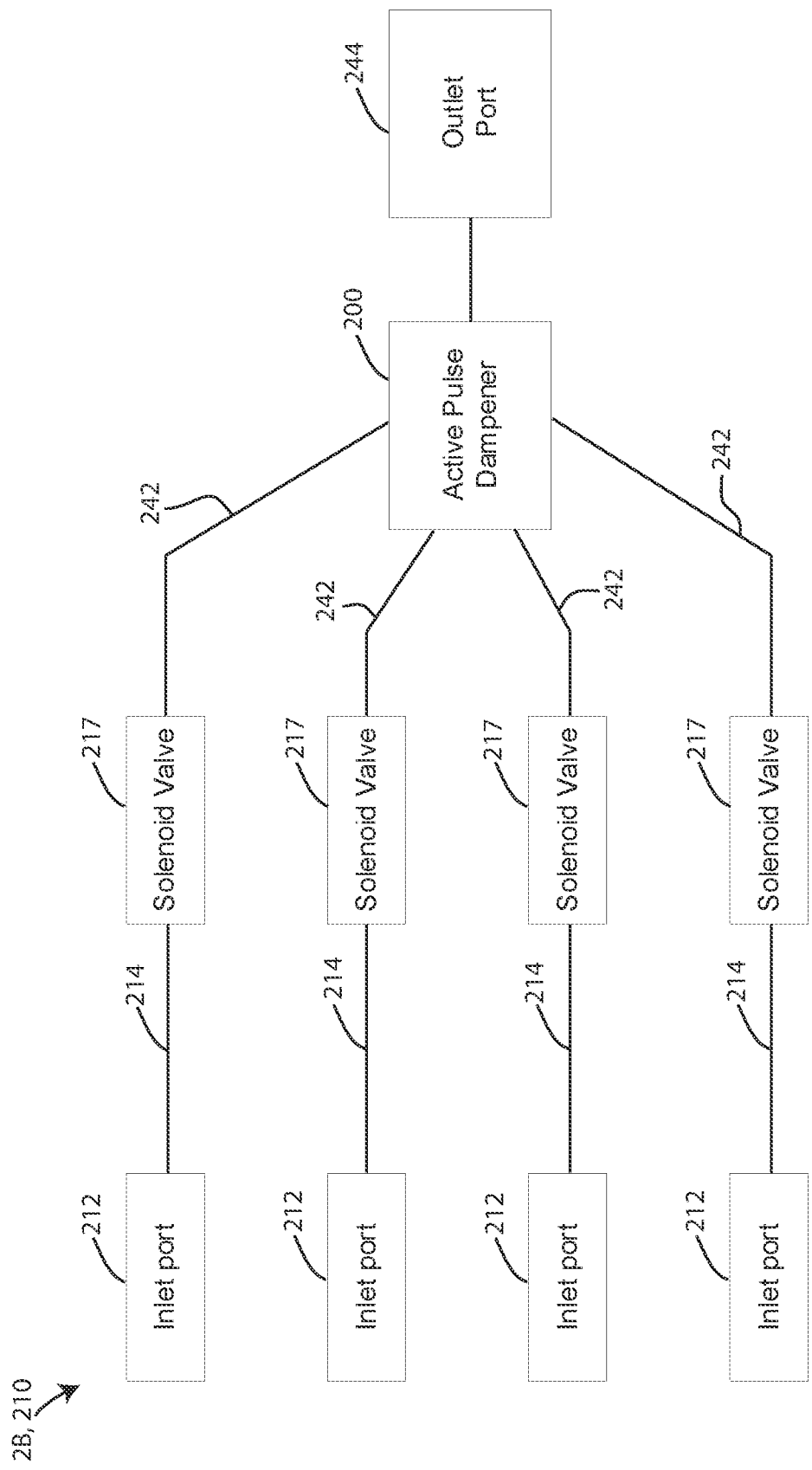
FIG. 4 depicts a schematic view of another gradient proportioning valve having an active pulse dampener, in accordance with one embodiment.

FIG. 4 depicts a schematic view of another exemplary gradient proportioning valve 2B having a fluidic dampening system that includes an active pulse dampener 200, in accordance with one embodiment. As shown, the gradient proportioning valve 2B includes a manifold 210 having four inlet ports 212, each connected to a respective solenoid valve 217 through respective inlet conduits 214. The solenoid valves 217 each include a port 242 that transfers fluid to the active pulse dampener 200. The active pulse dampener 200 may be located prior to mixing fluid, after mixing, or during mixing. The active pulse dampener 200 may be located downstream from the solenoid valves 217 of the system. The active pulse dampener 200 may be separate from the respective actuation mechanisms (i.e. the solenoid valves 217) and may be configured to actively introduce additional pressure pulses into the manifold 210 to destructively interfere with the unwanted fluidic pressure pulses created by the solenoid valves 217 and/or the manifold. Whatever the embodiment, the active pulse dampener 200 may be located in the manifold 210 prior to the fluid being transported to an outlet port 244.

The active pulse dampener 200 may further include a built in microprocessor or control system configured to control the active pulse dampener 200. Alternatively or additionally, the active pulse dampener 200 may be in communication with the control unit 9 of the liquid chromatography system 100. In this embodiment, the active pulse dampener 200 may include a communication device for sending and receiving control signals. In embodiments where the active pulse dampener 200 operates in a self-contained manner, communication with a system control unit, such as the control unit 9, may be unnecessary.

The active pulse dampener 200 may be housed in one singular GPV housing. In other embodiments, the active pulse dampener 200 may be a component that is broken off from the primary GPV housing into a standalone component. In either embodiment, the GPV may be a solenoid valve, a different type of valve, or other mechanism, that is configured to introduce an additional pressure signal which then attenuates the overall pressure response. In some embodiments of the active pulse dampener 200, one of the existing solenoid valves on the GPV could be used to introduce the additional signal. In other embodiments, one or more valves or some other mechanism may be added to the GPV for the sole purpose of introducing the additional signal. In whatever embodiment deployed, the active pulse dampener 200 may be configured to actively attenuate the pressure response.

The active pulse dampener 200 may be in communication with the control unit 9 or include one or more additional or alternative control systems. Contemplated implementations include obtaining, by such a control system of the active pulse dampener 200, an input signal in the form of an unwanted pressure response caused by opening/closing the GPV and/or the pump intake. The control system may then be configured to attenuate that signal and have the output signal be a nice, flat, consistent pressure response. The active pulse dampener 200 thereby is configured to act as the system controller. The active pulse dampener 200 may be configured to take the known input pressure response and actuate at such a time and in such a manner that the output response is attenuated. A feedback loop may be used by the control unit 9 or the one or more additional or alternative control systems of the active pulse dampener 200 to ensure that the response is attenuated in accordance with predetermined or set expectations. The timing of the active pulse dampener 200 may vary as the flow rate and solvent composition changes (therefore changing the GPV actuation timing). Such a feedback loop may help make sure the timing is sufficient for the given flow rate, composition, and solvents being used.

Figure 5:
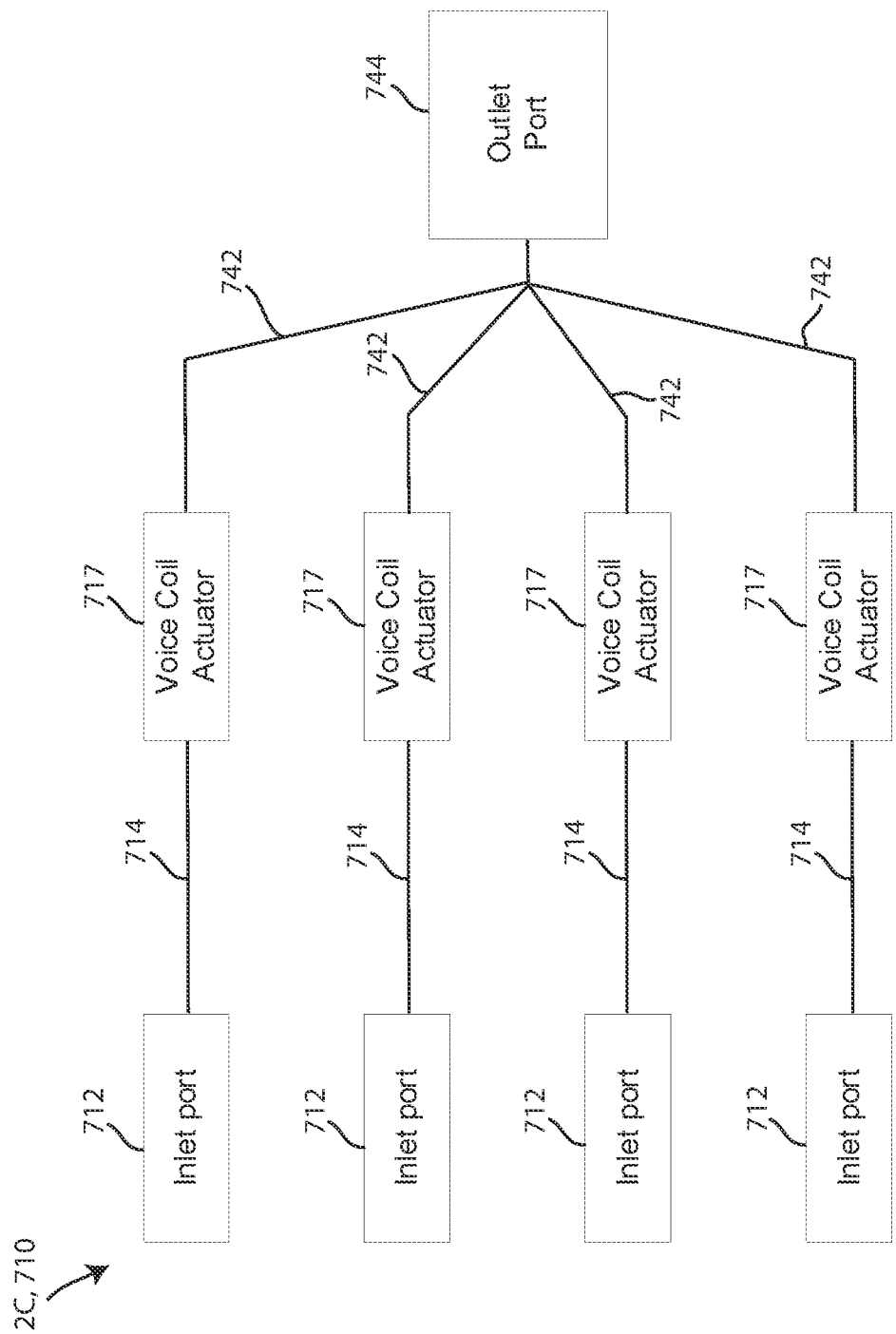
FIG. 5 depicts a schematic view of another gradient proportioning valve having a plurality of voice coil actuators, in accordance with one embodiment.

FIG. 5 depicts a schematic view of another gradient proportioning valve 2C having a plurality of voice coil actuators 717, in accordance with one embodiment. The gradient proportioning valve 2C includes four inlet ports 712 connected to the voice coil actuators 717 by respective inlet conduits 714. After the voice coil actuator 717, common ports 742 connect the fluidic paths at a mixing point. An outlet port 744 thereby transfers the mixed fluid downstream. The voice coil actuator valves 717 may be included as features of the fluidic dampening system of the gradient proportioning valve 2C. The voice coil actuators 717 may be configured to be opened and closed at variable speeds, which can be used to reduce, dampen or eliminate the magnitude of pressure pulses introduced to the system.

Referring to FIG. 6, a schematic view of another gradient proportioning valve 2D is shown having a dithering control unit 800, in accordance with one embodiment. Similar to the embodiments described above with the valves 2A-2C, the gradient proportioning valve 2D includes four inlet ports 812. Each of the inlet ports 812 is connected to a respective fluid conduit 814 configured for transporting fluid to a respective solenoid valve 817. The solenoid valves 817 are configured to transport fluid to an outlet port 844 via respective fluid conduits 842 which converge into a single stream or flow at or prior to the outlet port 844.

In one or more embodiments, the active fluidic dampening system includes a control system embodied by the dithering control unit 800 that is configured to alter the timing of opening and closing by the respective actuation mechanisms, such as the solenoid valves 817, to destructively interfere with the unwanted fluidic pressure pulses in the manifold. The dithering control unit 800 may be a component of the gradient proportioning valve 2D or may be a component of a greater liquid chromatography system, such as the control unit 9, or may be a combination of both a control unit contained within a gradient proportioning valve communicating with a control unit of a greater liquid chromatography system. The dithering control unit 800 may include a circuit board, chip or other processing device for controlling the timing of the respective solenoid valves 817, for example.

The dithering control unit 800 may be located in, for example, the embodiment of the gradient proportioning valve 2A. In such an embodiment, the solenoid valve 117A is located across from the solenoid valve 117C on the outer body of the manifold 110, while the solenoid valve 117B is located across from the solenoid valve 117D on the outer body of the manifold 110. The control system may be configured to open an opposing valve at a precise time when a primary valve opening creates a primary pressure pulse. The opening of an opposing valve to a primary valve opening may be done in order to purposefully create an opposing pressure pulse that destructively interferes with the primary pressure pulse. This mitigation may occur prior to or at a mixing point. The opening of the opposing valve may occur simultaneous to, or immediately following, the primary opening of the first valve. In still other embodiments, the control system may control a separate pulse introducing valve structure that is separate from the various solenoid valves (e.g. 117A, 117B, 117C, 117D) in the gradient proportioning valve.

In still other embodiments, the active fluidic dampening system and/or the dithering control system 800 may be configured to purposefully introduce pressure noise into the system in order to reduce quantization errors. This purposefully introduced noise may be introduced through consistently opening and closing the solenoid valves in a manner that creates a consistent noise that mitigates pressure pulses. While the control system for altering the timing of the opening and closing of respective actuation mechanisms and/or purposefully introducing noise has been described with reference to FIG. 6, such systems and methods may be utilized in combination with any of the other gradient proportioning valve embodiments described herein, or combinations thereof.

Embodiments of the invention further contemplate methods of mixing fluid using the principles described herein above. Methods of mixing fluid may first include providing a gradient proportioning valve consistent with one or more of the principles described herein and/or a liquid chromatography system having such a gradient proportioning valve. Methods may include receiving a plurality of fluids in a plurality of inlet ports of the gradient proportioning valve and mixing the plurality of fluids in a controlled manner within a manifold of the gradient proportioning valve to provide a fluid composition, the manifold including a plurality of conduits. Methods may include opening and closing each of the plurality of conduits in a controlled manner and outputting the fluid composition from a common outlet port of the gradient proportioning valve.

Methods may further include dampening unwanted fluidic pressure pulses in the manifold with an active fluidic dampening system.

In some embodiments, the opening and closing each of the plurality of conduits in a controlled manner is performed by a respective solenoid valve, and the method further includes absorbing unwanted fluidic pressure pulses created by the opening and closing of the solenoid valve with an energy absorbing solenoid armature stop located in at least one of the respective solenoid valves.

In some embodiments, methods may include actively introducing additional pressure pulses into the manifold and destructively interfering with unwanted fluidic pressure pulses in the manifold with an active pulse dampening actuator.

In some embodiments, methods may include altering the timing of the opening and closing by a control system, and destructively interfering with the unwanted fluidic pressure pulses in the manifold by the altering.

In some embodiments, opening and closing each of the plurality of conduits in a controlled manner is performed by a respective solenoid valve, and the method further includes mitigating unwanted fluidic pressure pulses created by the opening and closing of the solenoid valve with a ceramic sealing valve piston.

In some embodiments, the opening and closing each of the plurality of conduits in a controlled manner is performed by a respective voice coil actuator valve, and the method may include dampening the unwanted fluidic pressure pulses with the respective voice coil actuator valves, and opening and closing each of the plurality of conduits at variable speeds with the voice coil actuator valves.

While the invention has been shown and described with reference to specific embodiments, it should be understood by those skilled in the art that various changes in form and detail may be made therein without departing from the spirit and scope of the invention as recited in the accompanying claims. Further, while various embodiments of active forms of fluidic dampening of pressure pulses have been described in detail, these embodiments may be employed in unison, or in combination with some or all of the features described herein being incorporated into a single gradient proportioning valve. Still further, the active forms of fluidic dampening of pressure pulses can be supplemented in combination with one or more passive forms that require no power and/or control systems to function.

What is claimed is:

1. A gradient proportioning valve for liquid chromatography comprising:
   a plurality of inlet ports configured to receive a plurality of fluids;
   a manifold connected to each of the plurality of inlet ports configured to mix the plurality of fluids in a controlled manner to provide a fluid composition, the manifold including a plurality of conduits internal to the manifold, each of the plurality of conduits receiving fluid through a respective one of the plurality of inlet ports, each of the plurality of conduits operatively communicable to a respective actuation mechanism configured to open and close each of the plurality of conduits in a controlled manner, wherein each of the respective actuation mechanisms is a switch valve capable of controlled switching to determine fluid proportioning;
   a control system configured to control each of the switch valves;
   a common outlet port configured to receive the fluid composition; and
   an active fluidic dampening system configured to dampen unwanted fluidic pressure pulses in the manifold, wherein the active fluidic dampening system is located downstream from the respective actuation mechanisms and includes an active pulse dampening actuator separate from the respective actuation mechanisms, the active pulse dampening actuator configured to actively introduce additional pressure pulses into the manifold to destructively interfere with the unwanted fluidic pressure pulses in the manifold.

2. The gradient proportioning valve of claim 1, wherein the control system is configured to alter the timing of opening and closing by the respective actuation mechanisms to destructively interfere with the unwanted fluidic pressure pulses in the manifold.

3. The gradient proportioning valve of claim 2, wherein the control system is a dithering control unit built into the valve.

4. The gradient proportioning valve of claim 3, wherein the dithering control unit includes a communication device configured for at least one of sending and receiving control signals from a liquid chromatography system.

5. The gradient proportioning valve of claim 3, wherein the dithering control unit is configured to reduce quantization errors by purposefully introducing consistent pressure noise.

6. The gradient proportioning valve of claim 1, further comprising:
   the plurality of the respective actuation mechanisms, wherein each of the plurality of respective actuation mechanisms is a voice coil actuator valve, and wherein the fluidic dampening system includes the voice coil actuator valves.

7. The gradient proportioning valve of claim 1, wherein the active pulse dampening actuator includes the control system built into the valve for controlling the active pulse dampening actuator.

8. The gradient proportioning valve of claim 7, wherein the control system is configured to operate with a feedback loop to ensure proper dampening of the unwanted fluidic pressure pulses in the manifold.

9. The gradient proportioning valve of claim 7, wherein the control system includes a communication device configured for at least one of sending and receiving control signals from a liquid chromatography system.

10. The gradient proportioning valve of claim 9, wherein the communication device is configured to receive an input signal in response to an unwanted pressure response caused by one or more of the actuation mechanisms.

11. The gradient proportioning valve of claim 1, wherein the active pulse dampening actuator is located upstream from the common outlet port.

12. A liquid chromatography system comprising:
   the gradient proportioning valve of claim 1;
   an injector;
   a separation column; and
   a detector.

13. The gradient proportioning valve of claim 1, wherein each of the switch valves is a solenoid valve.

14. The gradient proportioning valve of claim 1, further comprising at least one accumulator chamber located downstream from at least one of the plurality of inlet ports and upstream from the respective actuation mechanism and the common outlet port.

15. A method of mixing fluid in liquid chromatography comprising:
   providing a gradient proportioning valve;
   receiving a plurality of fluids in a plurality of inlet ports of the gradient proportioning valve;
   mixing the plurality of fluids in a controlled manner within a manifold of the gradient proportioning valve to provide a fluid composition, the manifold including a plurality of conduits;

opening and closing each of the plurality of conduits in a controlled manner with respective actuation mechanisms, wherein each of the respective actuation mechanisms is a switch valve;

controlling the opening and closing of each of the switch valves with a control system of the gradient proportioning valve;

outputting the fluid composition from a common outlet port of the gradient proportioning valve;

dampening unwanted fluidic pressure pulses in the manifold with an active fluidic dampening system; and downstream from the opening and closing of each of the plurality of conduits in the controlled manner, actively introducing additional pressure pulses into the manifold and destructively interfering with the unwanted fluidic pressure pulses in the manifold with the active fluidic dampening system.

16. The method of claim 15, further comprising:

altering the timing of the opening and closing by the control system; and destructively interfering with the unwanted fluidic pressure pulses in the manifold by the altering.

17. The method of claim 16, further comprising ensuring, by the control system, proper dampening of the unwanted fluidic pressure pulses in the manifold with a feedback loop.

18. The method of claim 16, further comprising receiving, by the control system, an input signal in response to an unwanted pressure response caused by one or more of the actuation mechanisms.

19. The method of claim 15, wherein the opening and closing each of the plurality of conduits in a controlled manner is performed by a respective solenoid valve, the method further comprising:

mitigating the unwanted fluidic pressure pulses created by the opening and closing of the solenoid valve with a ceramic sealing valve piston.

20. The method of claim 15, wherein the opening and closing each of the plurality of conduits in a controlled manner is performed by a respective voice coil actuator valve, the method further comprising:

dampening the unwanted fluidic pressure pulses with the respective voice coil actuator valves; and opening and closing each of the plurality of conduits at variable speeds with the voice coil actuator valves.

* * * * *